United States Patent
Kassai

(10) Patent No.: US 8,001,343 B2
(45) Date of Patent: Aug. 16, 2011

(54) STORAGE DEVICE WITH POWER CONTROL FUNCTION

(75) Inventor: Kunihiko Kassai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 84 days.

(21) Appl. No.: 11/448,270

(22) Filed: Jun. 6, 2006

(65) Prior Publication Data

US 2007/0220198 A1    Sep. 20, 2007

(30) Foreign Application Priority Data

Mar. 17, 2006  (JP) ................. 2006-074610

(51) Int. Cl.
*G06F 12/00* (2006.01)
*G06F 13/00* (2006.01)
*G06F 13/28* (2006.01)

(52) U.S. Cl. ..................................... 711/162
(58) Field of Classification Search ............... 711/162
See application file for complete search history.

(56) References Cited

U.S. PATENT DOCUMENTS

| | | | |
|---|---|---|---|
| 6,583,947 B1 | 6/2003 | Hakamata et al. | |
| 2002/0144057 A1* | 10/2002 | Li et al. | 711/112 |
| 2004/0044698 A1* | 3/2004 | Ebata et al. | 707/200 |
| 2004/0236908 A1* | 11/2004 | Suzuki et al. | 711/114 |
| 2004/0268166 A1* | 12/2004 | Farkas et al. | 713/320 |

FOREIGN PATENT DOCUMENTS

| | | |
|---|---|---|
| JP | 3-95620 A | 4/1991 |
| JP | 11-272426 A | 10/1999 |
| JP | 2000-293314 A | 10/2000 |
| JP | 2001-93220 A | 4/2001 |
| WO | WO 03/067385 | 8/2003 |

OTHER PUBLICATIONS

"Japanese Office Action" mailed by JPO and corresponding to Japanese application No. 2006-074610 on Feb. 15, 2011, with English translation.

* cited by examiner

*Primary Examiner* — Kevin L Ellis
*Assistant Examiner* — Chad L Davidson
(74) *Attorney, Agent, or Firm* — Fujitsu Patent Center

(57) ABSTRACT

To provide a power controlling method for use in a storage device which can be operated with less power consumption, at least a storage capacity monitoring unit for monitoring the storage amount of data stored in each storage unit, a power-on unit for controlling the power-on of each storage unit, an access state monitoring unit for monitoring the state of accesses from an upper device to each storage unit, and a power-off unit for controlling the power-off of each storage unit are comprised, thereby controlling the power of a second storage unit.

19 Claims, 8 Drawing Sheets

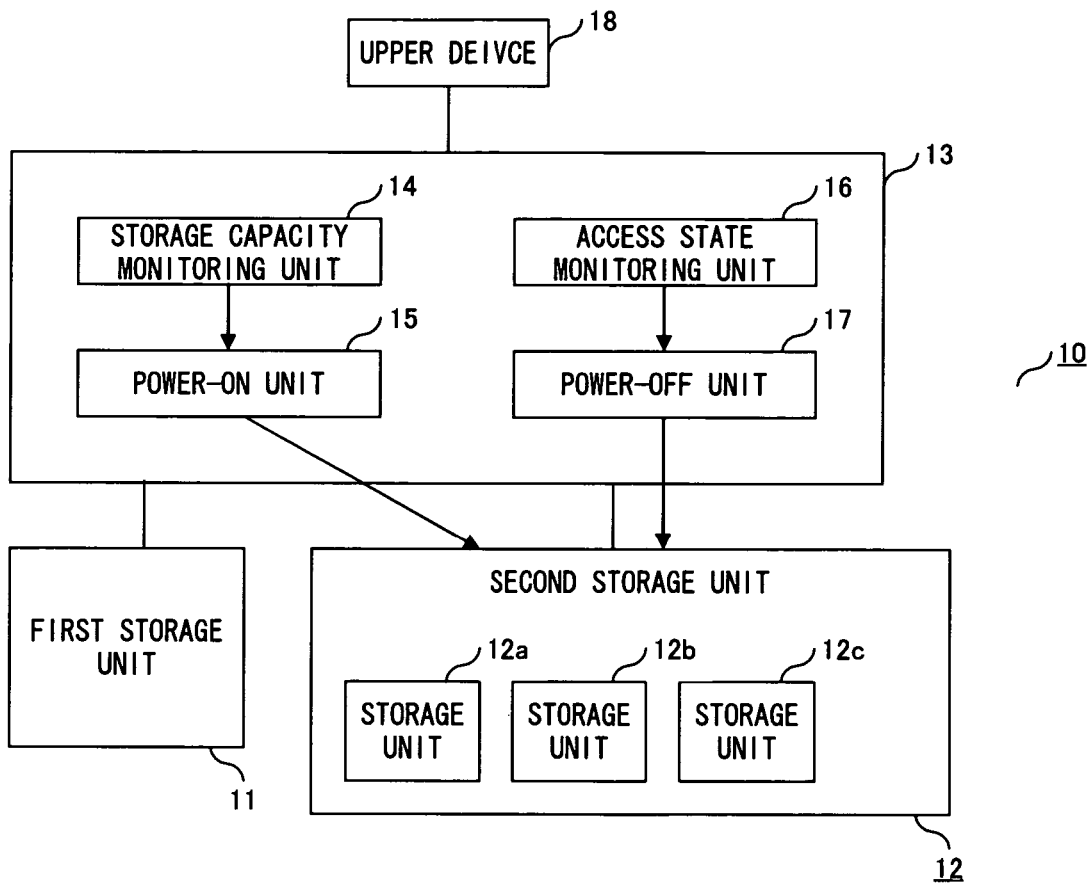
F I G. 1

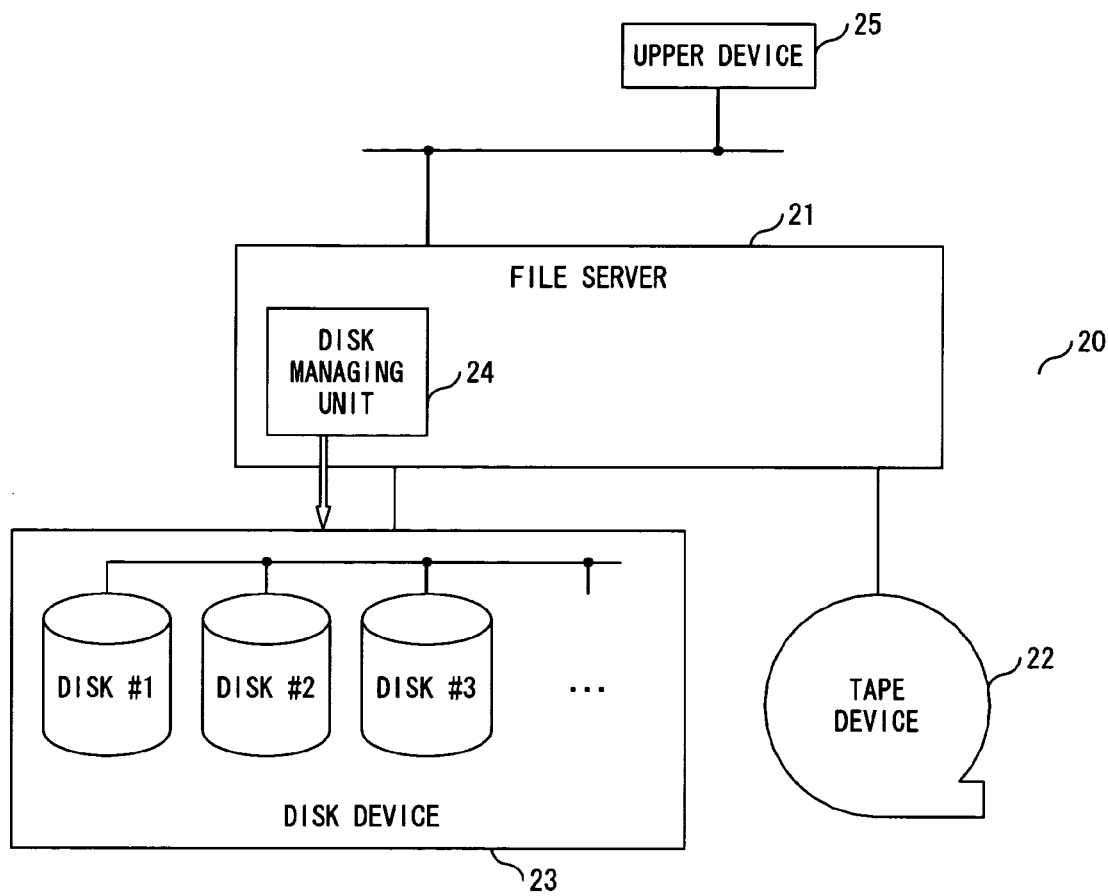
F I G. 2

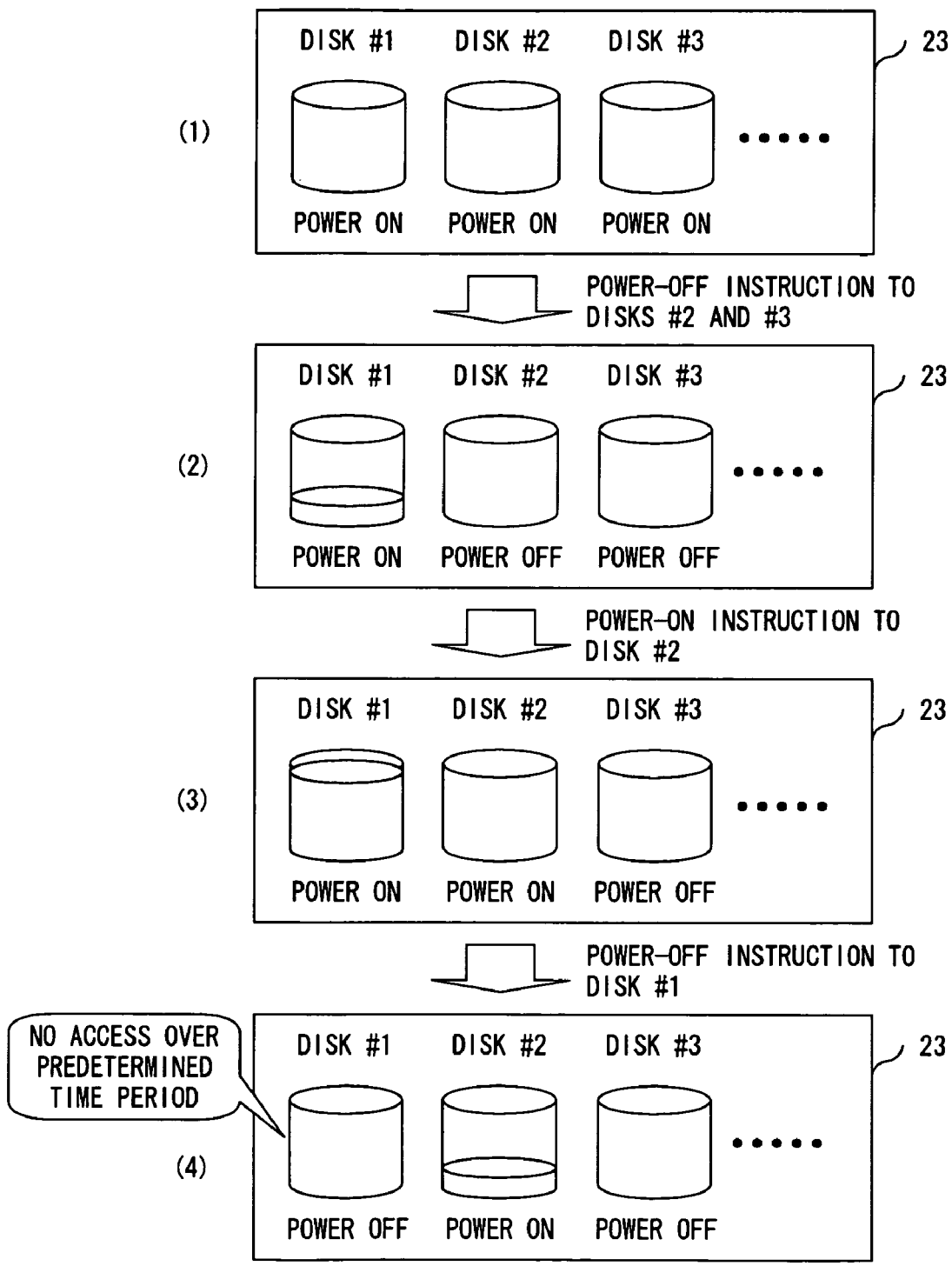
F I G. 3

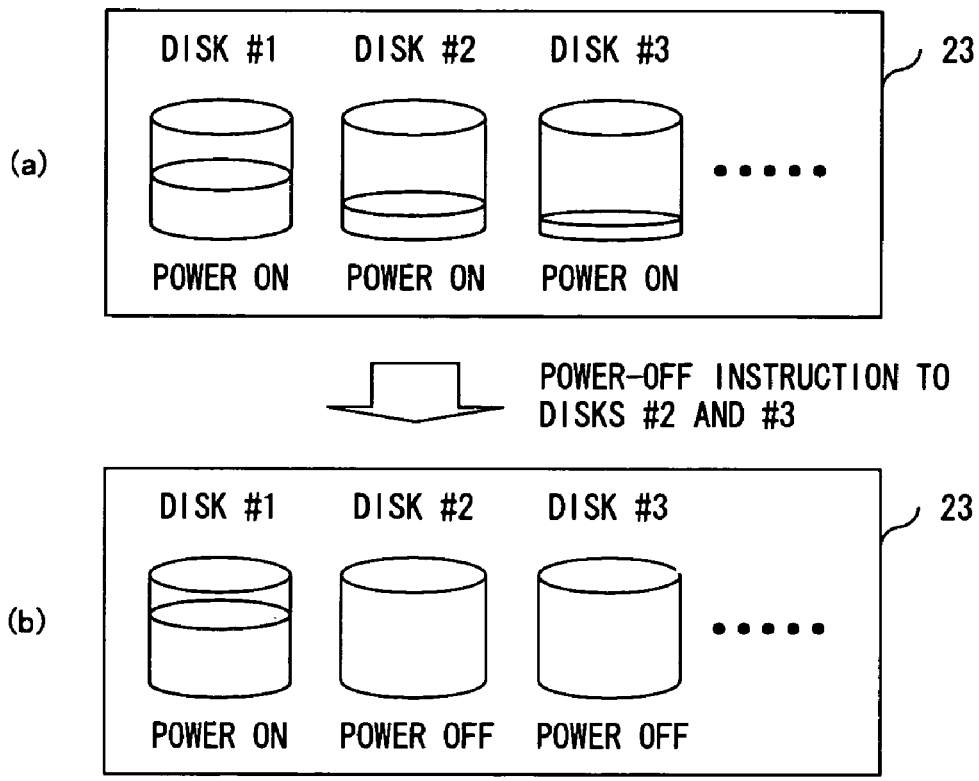
F I G. 5

STORAGE DEVICE WITH POWER CONTROL FUNCTION

BACKGROUND OF THE INVENTION

1. Field of the Invention

The present invention relates to a power controlling method for use in a storage device for storing a large amount of data over a long time.

2. Description of the Related Art

There may be many cases where data such as a contract document, an image and the like must be saved almost unchanged over a long time once the data is created. An archive device is used as a storage device for storing/saving a large amount of such data (fixed contents) over a long time.

However, since a conventional archive device operates in a state where an unused disk device which stores no data is always powered on also, power must be supplied also to the unused disk device, leading to an excess of power consumption. This poses a problem such that the operational cost of the archive device increases.

There is also a problem such that the amount of heat produced by the archive device increases as a result of consuming excess power, and hence air-conditioning equipment at an installation site must be enhanced.

Publication in Japan of translation of PCT International Patent Application: No. 2005-517236 discloses an HDD storage system for reducing power consumption and heat produced by the system by selectively supplying power to one or more storage devices on demand.

SUMMARY OF THE INVENTION

The present invention was developed in consideration of the above described problems, and aims at providing a power controlling method for use in a storage device which can be operated with less power consumption.

To overcome the above described problems, the storage device according to the present invention, which has a first storage unit for storing data transmitted from an upper device over a long time and a second storage unit for temporarily storing data including part of the data stored in the first storage unit, comprises: a storage capacity monitoring unit for monitoring the storage amount of data stored in a plurality of storage units configuring the second storage unit, and for detecting a storage unit the storage amount of which becomes a predetermined ratio or higher; a power-on unit for powering on a storage unit by issuing a power-on instruction to the storage unit to be used next to the storage unit detected by the storage capacity monitoring unit; an access state monitoring unit for monitoring the state of an access from the upper device in the plurality of storage units configuring the second storage unit, and for detecting a storage unit to which no accesses are made over a predetermined time period; and a power-off unit for powering off storage units by issuing a power-off instruction to the storage unit which stores no data, and the storage unit which stores data up to its maximum storage capacity among storage units detected by the access state monitoring unit.

According to the present invention, the power-off unit powers off storage units by issuing the power-off instruction to the storage unit which stores no data, and the storage unit which stores data up to its maximum storage capacity among storage units to which no accesses are made from an upper device over a certain time period.

In the meantime, if the storage amount of data stored, for example, in the currently used storage unit becomes a predetermined ratio or higher, the power-on unit powers on a storage unit by issuing the power-on instruction to the storage unit to be used next to the currently used storage unit.

As a result, the storage device can be operated while powering off an unused storage unit and a storage unit the use frequency of which is low, whereby the storage device can be operated with less power consumption.

As described above, according to the present invention, the power controlling method for use in the storage device, which can be operated with less power, can be provided.

BRIEF DESCRIPTION OF THE DRAWINGS

FIG. 1 is a schematic explaining the outline of a storage device according to a preferred embodiment of the present invention;

FIG. 2 is a schematic exemplifying a configuration of an archive device according to the preferred embodiment of the present invention;

FIG. 3 is a schematic exemplifying a process performed by an archive device according to a first preferred embodiment;

FIG. 5 is a schematic exemplifying a process performed by an archive device according to a second preferred embodiment;

DESCRIPTION OF THE PREFERRED EMBODIMENTS

Figure 4:
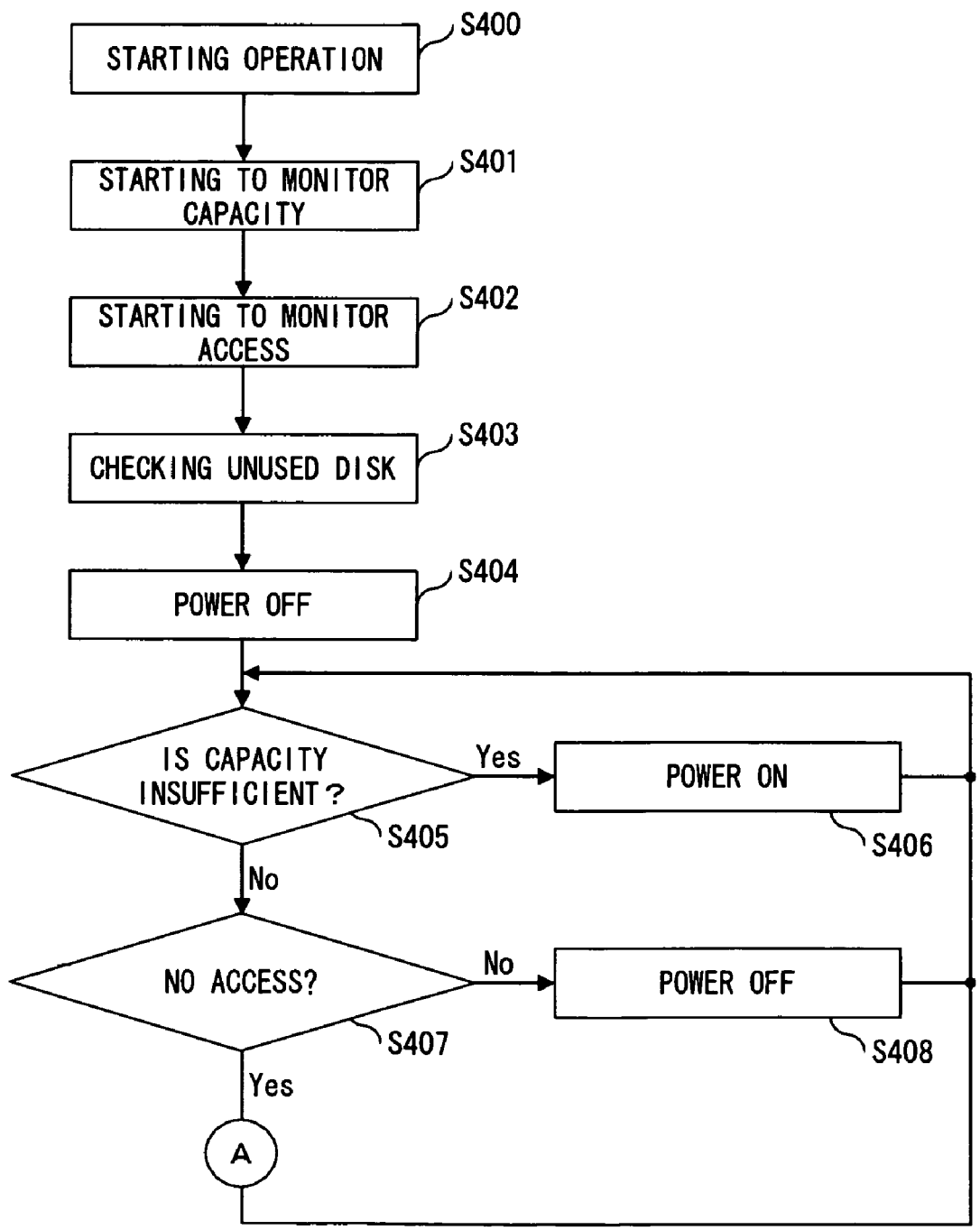
FIG. 4 is a flowchart showing the process performed by the archive device according to the first preferred embodiment.

Preferred embodiments according to the present invention are hereinafter described with reference to FIGS. 1 to 8.

FIG. 1 is a schematic explaining the outline of a storage device 10 according to a preferred embodiment of the present invention.

The storage device 10 shown in FIG. 1 comprises at least a first storage unit 11, a second storage unit 12, and a controlling unit 13 for controlling the first and the second storage units.

The first storage unit 11 is a storage unit of relatively large capacity, which is used when data transmitted from an upper device 18 is stored over a long time. This unit is implemented, for example, with a tape device or the like.

The second storage unit 12 comprises a plurality of storage units, and is a storage unit of relatively small capacity which temporarily stores the data transmitted from the upper device 18 or part of data stored in the first storage unit 11. This unit is implemented, for example, with a plurality of RAID devices configured by magnetic disk devices, or the like.

The data transmitted from the upper device 18 is initially stored in the second storage unit 12. Then, the data is moved to the first storage unit 11 after a predetermined time period elapses or as occasion demands. When the data is requested from the upper device 18, the data is transmitted to the upper device 18 if the corresponding data exists in the second storage unit 12. Or, if the corresponding data does not exist in the second storage unit 12, the corresponding data stored in the first storage unit 11 is transmitted to the upper device, and temporarily stored in the second storage unit 12. As described above, the second storage unit 12 operates like a second cache.

The controlling unit 13 comprises at least a storage capacity monitoring unit 14 for monitoring the storage amount of data stored in each of the storage units 12a, 12b, 12c, ..., which configure the second storage unit 12, a power-on unit 15 for controlling the power-on of each of the storage units 12a, 12b, 12c, ..., an access state monitoring unit 16 for monitoring the state of an access (read/write operation) made from the upper device 18 to each of the storage units 12a, 12b, 12c, ..., and a power-off unit 17 for controlling the power-off of each of the storage units 12a, 12b, 12c, .... The controlling unit 13 controls the power of the second storage unit 12.

The storage capacity monitoring unit 14 monitors the storage amount of data stored in each of the storage units 12a, 12b, 12c, ..., which configure the second storage unit 12, and detects a storage unit the storage capacity of which becomes a predetermined ratio or higher (for example, a storage unit the data storage amount of which is 90 percent of its maximum storage capacity).

When the storage capacity monitoring unit 14 detects the storage unit the storage amount of which becomes the predetermined ratio or higher, the power-on unit 15 powers on a storage unit, which is used next to this storage unit, by issuing the power-on instruction to the storage unit to be used next.

The access state monitoring unit 16 monitors the state of an access operation (read/write operation) performed from the upper device 18 to each of the storage units 12a, 12b, 12c, ..., which configure the second storage unit 12, and detects a storage unit to which no accesses are made from the upper device 18 over a predetermined time period.

The power-off unit 17 extracts a storage unit which stores no data (for example, a storage unit in an initialized state) and a storage unit which stores data up to its maximum capacity from among storage units which are detected by the access state monitoring unit 16 and to which no accesses are made from the upper device 18 over a predetermined time period, and powers off the extracted storage units by issuing the power-off instruction to the extracted storage units.

Accordingly, the storage device 10 is operated by powering off, for example, an empty storage unit immediately after the storage device 10 starts to be operated, and a storage unit which stores data up to its maximum storage capacity, whereby the storage device can be operated with less power consumption.

FIG. 2 is a schematic exemplifying a configuration of an archive device 20, which is the storage device 10 according to the preferred embodiment of the present invention.

The archive device 20 shown in FIG. 2 comprises a file server (controlling unit) 21, a tape device (the first storage unit) 22, and a disk device (the second storage unit) 23. The file server 21, the tape device 22, and the disk device 23 respectively correspond to the controlling unit 13, the first storage unit 11, and the second storage unit 12. Disks #1, #2, #3, ..., which configure the disk device 23, respectively correspond to the storage units 12a, 12b, 12c, ....

The file server 21 is implemented with a general information processing device. This server comprises a disk managing unit 24 for managing the disk device 23 in addition to a function as the file server. The disk managing unit 24 is implemented in a way such that the file server 21 executes a predetermined program.

The disk managing unit 24 controls the position of data stored in the disk device 23, or the power of each of the disks configuring the disk device 23.

The tape device 22 is a storage device of large storage capacity such as 10 terabytes.

The disk device 23 is a storage device configured by a plurality of disks (disks #1, #2, #3, ... shown in FIG. 2). The storage capacity of the disk device 23 is small in comparison with the tape device 22. For example, if the storage capacity of the tape device 22 is 10 terabytes, a disk device of storage capacity with the order of 1 terabytes is used. Additionally, the disks #1, #2, #3, ... are respectively configured, for example, with RAID.

The archive device 20 is connected to an upper device 25 via a network, dedicated line or the like. For example, if a write operation is performed by the upper device 25 on the archive device 20, the file server 21 initially writes data received from the upper device 25 to the disk device 23. Then, the file server 21 moves the data from the disk device 23 to the tape device 22 after a predetermined time period elapses or as occasion demands.

If a read operation is performed by the upper device 25 on the archive device 20, the file server 21 initially checks whether or not corresponding data exists in the disk device 23. If the corresponding data exists in the disk device 23, the file server 21 reads the data and transmits the read data to the upper device 25.

Or, if the corresponding data does not exist in the disk device 23, the file server 21 reads the corresponding data from the tape device 22 and transmits the read data to the upper device 25. At the same time, the file server 21 also writes the corresponding data to the disk device 23 on demand.

As described above, the archive device 20 uses the disk device 23 like a second cache while implementing the storage device of large capacity by using the tape device 22, thereby implementing high response performance.

First Preferred Embodiment

The archive device 20 according to the first preferred embodiment checks the use state of each of the disks #1, #2, #3, ..., and suppresses power consumption by powering off an unused disk. The unused disk is a disk which is initialized and stores no data. In the meantime, a used disk (or a disk in use) is a disk to which accesses are consecutively or intermittently made (an access interval is a predetermined time period or shorter) from the upper device 25.

Additionally, the state of an access from the upper device 25 to each of the disks #1, #2, #3, ... is monitored, and also a disk to which no accesses are made over a predetermined time period is powered off to suppress power consumption.

Furthermore, the storage amount of each of the disks #1, #2, #3, ... is monitored, and a disk to be used next is powered on beforehand when a disk the storage amount of which becomes a predetermined ratio or higher is detected, so that data is efficiently stored.

FIG. 3 is a schematic exemplifying a process performed by the archive device 20 according to the first preferred embodiment.

A state (1) shown in FIG. 3 represents the state of the disk device 23 when the archive device 20 is activated. Each of the disks #1, #2, #3, ... is in an initialized state (state where data is not stored). Since the disk device 23 has just been activated, each of the disks #1, #2, #3, ... is powered on.

When the archive device 20 starts to be operated, data is stored in the disk device 23 with a write operation performed by the upper device 25.

A state (2) represents a state where data is stored on the disk #1, and not stored on the disks #2 and #3. The disk managing unit 24 detects the disks #2 and #3 as unused disks, and powers off the disks #2 and #3 by issuing the power-off instruction to these disks.

If the archive device 20 continues to be operated, also the amount of data stored on the disk #1 increases.

A state (3) represents a state where data is stored on the disk #1, for example, up to 90 percent of its maximum storage capacity. At this time, the disk managing unit 24 powers on the disk #2 by issuing the power-on instruction to the disk #2 to be used next.

If data is stored on the disk #1 up to its maximum storage capacity, the archive device 20 will store data next on the disk #2.

A state (4) represents a state where the disk #2 is in use, and no accesses are made to the disk #1 over a predetermined time period. The disk managing unit 24 powers off the disk #1 by issuing the power-off instruction to the disk #1 to which no accesses are made over a predetermined time period.

FIG. 4 is a flowchart showing the process performed by the archive device 20 according to the first preferred embodiment.

When the archive device 20 starts to be operated, it transfers the process from step S400 to step S401.

In step S401, the disk managing unit 24 starts to monitor the storage capacity of data on each of the disks #1, #2, #3, . . . , and transfers the process to step S402. Then, the disk managing unit 24 starts to monitor the state of an access from the upper device 25 to each of the disks #1, #2, #3, . . . .

In step S403, the disk managing unit 24 extracts an unused disk by checking the use state of each of the disks #1, #2, #3, . . . . Then, in step S404, the disk managing unit 24 issues the power-off instruction to the unused disk. The disk which receives the power-off instruction from the disk managing unit 24 enters a power-off state.

In step S405, the disk managing unit 24 checks the storage amount of data of the currently used disk. If the storage amount of data is 90 percent of the maximum storage capacity or higher, the disk managing unit 24 judges that the storage capacity is insufficient, and transfers the process to step S406.

In step S406, the disk managing unit 24 issues the power-on instruction to a disk to be used next to the currently used disk. The disk which receives the power-on instruction from the disk managing unit 24 enters a power-on state. Note that the disk to be used next is predetermined.

In step S407, the disk managing unit 24 extracts disks which store data up to their maximum storage capacity from among the disks #1, #2, #3, . . . . After detecting a disk, to which read and write operations are not performed from the upper device 25 over a predetermined time period, from among the extracted disks, the disk managing unit 24 transfers the process to step S408.

In step S408, the disk managing unit 24 issues the power-off instruction to the disk detected in step S407. The disk which receives the power-off instruction from the disk managing unit 24 enters a power-off state.

Then, the disk management unit 24 repeats the processes in steps S405 through S408 until the operation of the archive device 20 terminates.

Second Preferred Embodiment

An archive device 20 according to the second preferred embodiment performs the following processes in addition to the processes performed according to the first preferred embodiment shown in FIG. 4.

A disk device 23 is used like a second cache in order to improve the response performance of the archive device 20. Therefore, if no accesses are made from the upper device 25 to data stored in the disk device 23 over a predetermined time period, the corresponding data is stored in a tape device 22 and deleted from the disk device 23, so that the disk device the storage capacity of which is small is effectively used.

However, if the storage and deletion of data is repeated with this process, the data scatter and exist on a plurality of disks (for example, a state (a) of FIG. 5). As a result, the number of disks which could be powered off is reduced, and the effect of reducing power consumption decreases in some cases.

Accordingly, the data that scatter and exist on the disks #1, #2, #3, . . . are moved and collected onto a predetermined disk, whereby an unused disk is secured and powered off.

If it is difficult to move the scattered data, an unused disk may be secured by collecting data to which no accesses are made over a predetermined time period onto the same disk, for which the power-off process may be performed.

FIG. 5 is a schematic exemplifying the process performed by the archive device 20 according to the second preferred embodiment.

The state (a) shown in FIG. 5 represents the state where the data scatter and exist on the plurality of disks as a result of repeating storage and deletion for the disks #1, #2, #3, . . . . At this time, since the data are stored on the respective disks #1 through #3, their power-on state must be maintained.

Upon detection of a plurality of disks the use ratio of which is a predetermined ratio or lower, the archive device 20 collects data onto any of the plurality of disks. The use ratio referred to here means a ratio of the storage amount of data stored on a disk to its maximum storage capacity.

A state (b) represents a state where the data on the disks #2 and #3 are moved and collected onto the disk #1. In this case, since the disks #2 and #3 become unused, the disk managing unit 24 issues the power-off instruction to the disks #2 and #3 in order to power off these disks.

In the second preferred embodiment, a disk use order (priorities of disks for storing data) optimum for the hardware configuration (such as an arrangement of the disks #1, #2, #3, . . . and cooling fans) of the disk device 23 is predetermined. Thus, heat produced within the disk device 23 can be efficiently cooled down with cooling fans. Additionally, the heat produced within the disk device 23 can be efficiently cooled down, whereby the heat produced within the disk device 23 can be cooled down despite the low-speed rotation of the cooling fans, and power consumption can be reduced.

Figure 6:
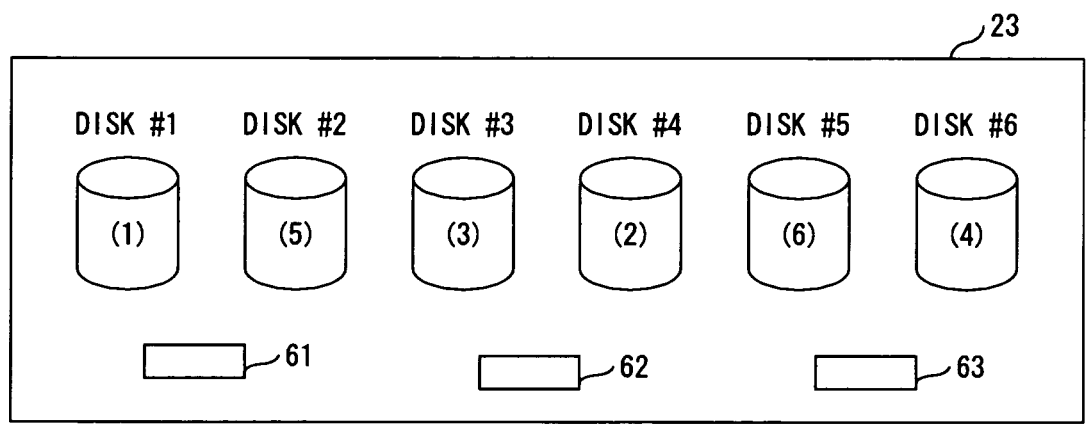
FIG. 6 is a schematic exemplifying a configuration of a disk device according to the second preferred embodiment.

FIG. 6 is a schematic exemplifying a configuration of the disk device 23 according to the second preferred embodiment.

The disk device 23 shown in FIG. 6 comprises disks #1 through #6, and cooling fans 61 through 63. The cooling fans 61, 62, and 63 are arranged respectively between the disks #1 and #2, between the disks #3 and #4, and between the disks #5 and #6.

The disk device 23 according to the second preferred embodiment is configured by the six disks and the three cooling fans as an example. However, the configuration of the disk device 23 is not limited to this one as a matter of course. The number of disks and that of cooling fans may be determined depending on need. Also the arrangement of the cooling fans, which is shown in FIG. 6, is merely one example. Cooling fans may be arranged in positions considered to be optimum depending on need.

(1) through (6) shown in the disks #1 through #6 indicate priorities when the disks are used. Namely, the archive device 20 fills the disks #1, #4, #3, #6, #2, and #5 with data in this order.

The priories used in this preferred embodiment are an order utilized to determine a disk to be used next when the storage capacity of the currently used disk becomes full.

Accordingly, the archive device 20 according to the second preferred embodiment performs a data move process to be described below in addition to the processes shown in FIG. 4.

Figure 7:
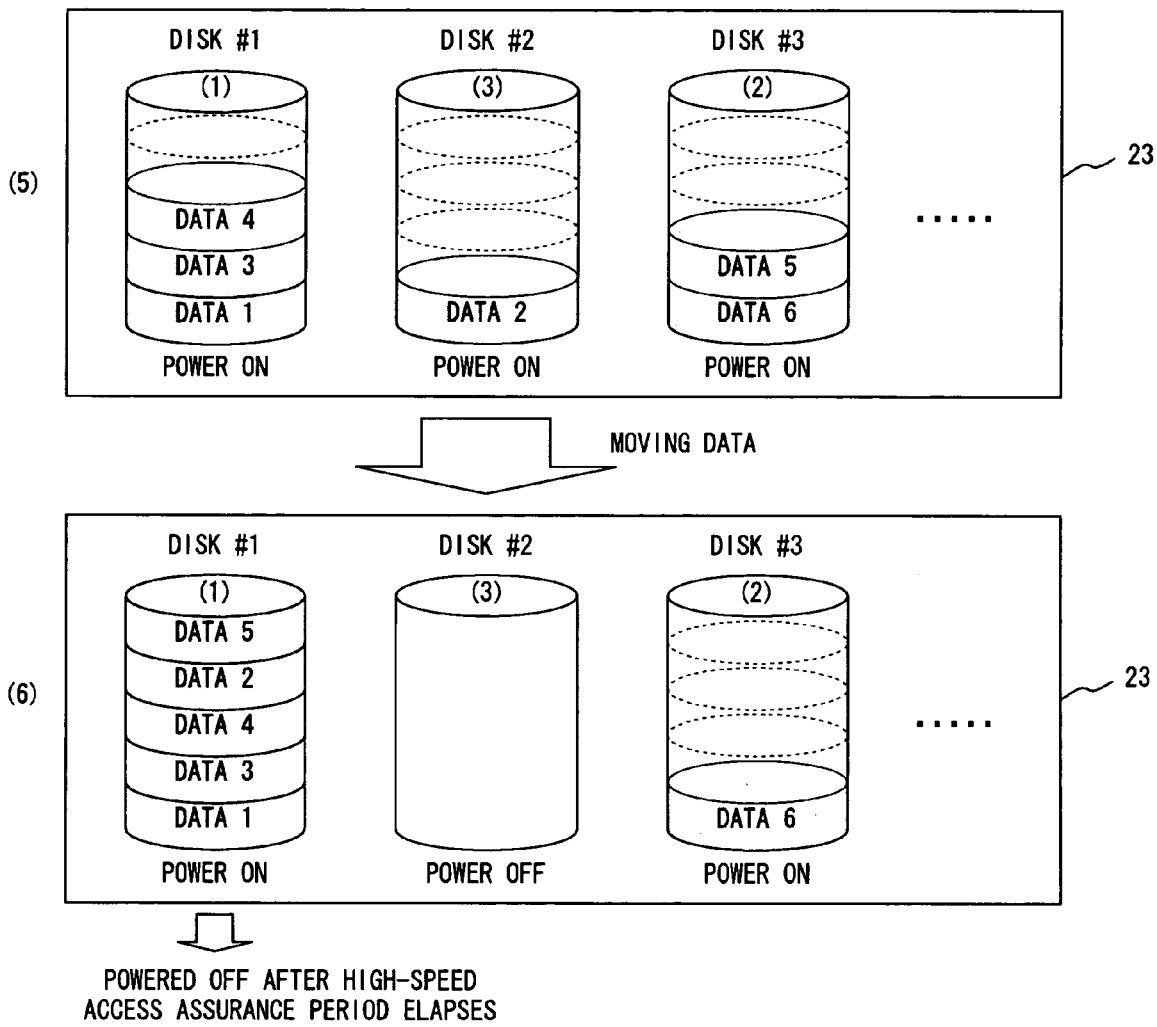
FIG. 7 is a schematic explaining a data move process performed by the archive device according to the second preferred embodiment.

FIG. 7 is a schematic explaining the data move process performed by the archive device 20 according to the second preferred embodiment.

A state (5) shown in FIG. 7 represents a state where data scatter and exist on a plurality of disks as a result of repeating storage and deletion for the disks #1, #2, #3, . . . in a similar manner as in the state (a) shown in FIG. 5. In the disk device 23 in the state (5), data 1, 3, and 4 are stored on the disk #1, data 2 is stored on the disk #2, and data 5 and 6 are stored on the disk #3.

Because the disk device 23 uses all of the disks #1 through #3, they are in a power-on state.

Here, for the archive device 20 according to the second preferred embodiment, the disk use order (hereinafter referred to simply as priorities) optimum for the hardware configuration of the disk device 23 is predetermined also as shown in FIG. 6. (1) through (3) shown in the disks #1 through #3 indicate the priories when the disks are used.

Note that the priorities are higher as their numerals are smaller. Accordingly, in the disk device 23 shown in FIG. 7, the data are stored onto the disks #1, #3, and #2 in this priority order.

Upon detection of disks the use ratio of which is the predetermined ratio or lower, the disk managing unit 24 refers to the priorities stored, for example, in a memory comprised by the file server 21, and moves the data to a disk having the highest priority.

A state (6) represents a state where data which scatter on the disks #1 to #3 are moved to the disks having higher priorities. The disk managing unit 24 initially moves the data to the disk #1 having the highest priority. When the disk #1 becomes full, the disk managing unit 24 moves the data to the disk #3 having a priority of highest second to the disk #1.

As a result, the data 2 and 5 are newly stored onto the disk #1, the remaining capacity of which is reduced to 0, and the disk #2 becomes unused. Additionally, the disk #3 is in present use. Accordingly, the disks #1 and #2 can be powered off.

In this preferred embodiment, to assure a high-speed access to moved data, the disk #1 is powered off by issuing the power-off instruction to this disk after a high-speed access assurance period elapses.

Figure 8:
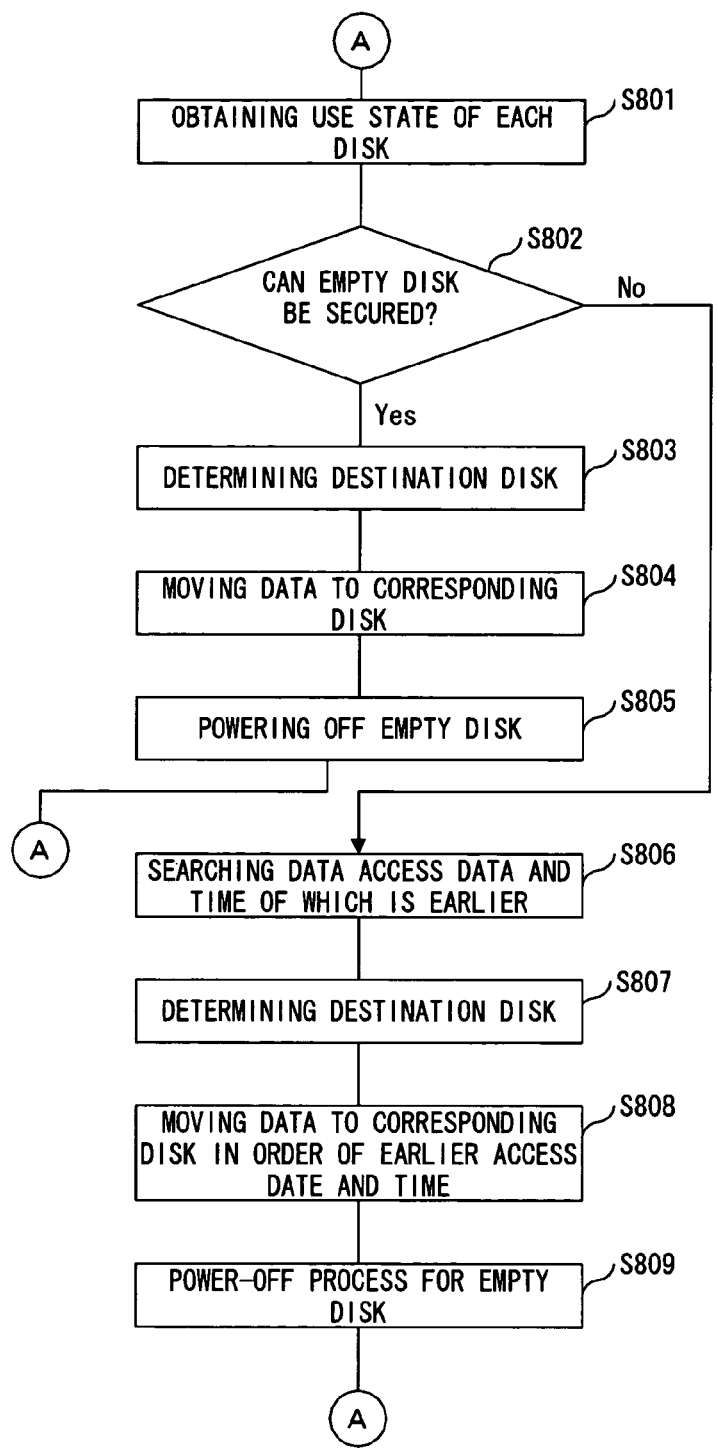
FIG. 8 is a flowchart showing the process performed by the archive device according to the second preferred embodiment.

FIG. 8 is a flowchart showing the process performed by the archive device 20 according to the second preferred embodiment. The archive device 20 according to the second preferred embodiment performs the following processes in addition to the processes shown in FIG. 4.

If "NO" is selected in step S407 shown in FIG. 4, the disk managing unit 24 transfers the process to step S801.

In step S801, the disk managing unit 24 obtains the use state of each disk. For example, the disk managing unit 24 obtains the amount of data stored on each disk by referencing a data management table from the memory comprised by the file server 21. The data management table is a management table for managing the storage state (the total amount of stored data, storage position, storage date, etc. of each data) of data stored on each disk. Normally, this table is generated/updated when the file server 21 writes data to a disk.

In step S802, the disk managing unit 24 judges whether or not it becomes possible to secure an empty disk by moving the data. For example, the disk managing unit 24 extracts from the data management table a disk the use ratio of which is within a predetermined range. If an empty disk can be secured by moving extracted data, the disk managing unit transfers the process to step S803.

In step S803, the disk managing unit 24 determines a destination disk to which the data is to be moved (hereinafter referred to as a destination disk). Here, the destination disk is determined according to the priorities of disks. Namely, a disk having the highest priority among disks extracted in step S802 is defined to be the destination disk.

After determining the destination disk, the disk managing unit 24 transfers the process to step S804. Then, the disk managing unit 24 sequentially moves the data starting from, for example, the data stored on a disk having lower priority to the destination disk.

After securing an empty disk by moving the data, the disk managing unit 24 transfers the process to step S805, in which the disk managing unit 24 issues the power-off instruction to the empty disk. The disk which receives the power-off instruction enters a power-off state.

Or, if the disk managing unit 24 judges in step S802 that an empty disk cannot be secured by moving the data, it transfers the process to step S806.

In step S806, the disk managing unit 24 refers to the data management table, and searches for old data which experiences the passage of a predetermined time period from a date and time on which the upper device 25 makes the last access (hereinafter referred to as access date and time). Then, the disk managing unit 24 transfers the process to step S807, in which a destination disk is determined in a similar manner as in step S803.

After determining the destination disk, the disk managing unit 24 transfers the process to step S808, in which the disk managing unit 24 moves the data to the destination disk in order of earlier access date and time. After securing an empty disk by moving the data, the disk managing unit 24 transfers the process to step S809, in which the disk managing unit 24 issues the power-off instruction to the empty disk. The disk which receives the power-off instruction enters a power-off state.

Upon completion of the process in step S805 or S809, the disk managing unit 24 transfers the process to step S405 shown in FIG. 4. Then, the processes in steps S405 through S408 and S801 through S809 are repeated at predetermined time intervals or as occasion demands until the operation of the archive device 20 terminates.

Note that the disk managing unit 24 may issue the power-on instruction to a disk having a priority second to the currently used disk in the power-on process in step S406 shown in FIG. 4, although this is not shown in FIG. 8.

As described above, the archive device 20 according to the first or the second preferred embodiment operates the storage device 10 by powering off, for example, an empty disk used immediately after the archive device 20 starts to be operated, or a disk which stores data up to its maximum storage capacity. Therefore, only a minimum number of disks according to the amount of data to be stored can be used and operated. As a result, the archive device 20 can be operated with less power by suppressing power consumption.

Additionally, the archive device 20 can be operated with less power, whereby its operation cost can be suppressed to low.

Furthermore, in the archive device 20 according to the second preferred embodiment, an empty disk is secured by collecting data which scatter and exist on a plurality of disks as a result of operation, or data the access date and time of which is old, and the empty disk is powered off. Therefore, even if data scatter and exist on a plurality of disks as a result of operation, the operation can be continued by using only a minimum number of disks required according to the amount of data to be stored. Consequently, the archive device 20 can be operated with less power by suppressing power consumption, whereby its operational cost can be suppressed to low.

Still further, in the archive device 20 according to the second preferred embodiment, a destination disk in step S803 or S807 is determined according to the priorities of disks, which are determined to increase the cooling efficiency to the highest in accordance with the hardware configuration of the disk device 23. Therefore, the disks are powered on in order of priorities, and heat produced within the disk device 23 can be efficiently cooled down. As a result, the heat produced within the disk device 23 can be cooled down even if cooling fans rotate at low speed, whereby power consumption can be further reduced.

Still further, the amount of produced heat can be suppressed, whereby air-conditioning equipment can be simplified, which leads to a reduction in cost.

What is claimed is:

1. A storage device, which has a first storage unit for storing data transmitted from an upper device over a long time and a second storage unit for temporarily storing data including part of the data stored in the first storage unit, comprising:
    a storage capacity monitoring unit to monitor a storage amount of data stored in a plurality of storage units, to configure the second storage unit, and to detect a storage unit the storage amount of which is a predetermined ratio or higher;
    a power-on unit to determine a storage unit to be used next to the storage unit detected by the storage capacity monitoring unit, using priorities of the storage units, the priorities of which are determined to increase the cooling efficiency to the highest in accordance with the hardware configuration of the storage unit, and to power on a storage unit by issuing a power-on instruction to the determined storage unit;
    an access state monitoring unit to monitor a state of accesses from the upper device to the plurality of storage units, to configure the second storage unit, and to detect a storage unit to which no access is made over a time period; and
    a power-off unit to power off storage units by issuing a power-off instruction to the storage unit which stores no data, and the storage unit which stores data up to its maximum storage capacity among storage units detected by the access state monitoring unit.

2. The storage device according to claim 1, wherein
    the power-on unit to power on a storage unit by issuing the power-on instruction to the storage unit a priority of which is second to the storage unit detected by the storage capacity monitoring unit.

3. The storage device according to claim 2, wherein
    the priority is an order determined so that a cooling effect produced by cooling units is increased to the highest in a positional relationship between the storage units configuring the second storage unit and the cooling units for cooling down heat produced from the storage units.

4. The storage device according to claim 1, further comprising:
    a data collecting unit to identify one storage unit by extracting a storage unit the data storage amount of which is within a range from among the storage units detected by the access state monitoring unit, and to move data stored in the extracted storage unit to the one storage unit.

5. The storage device according to claim 4, wherein
    the data collecting unit extracts third storage units a data storage amount of which is within a range from among the storage units detected by the access state monitoring unit, and defines a fourth storage unit, a priority of which is the highest among the third storage units, to be the one storage unit.

6. The storage device according to claim 5, wherein
    the priority is determined so that a cooling effect produced by cooling units is increased to the highest in a positional relationship between the storage units configuring the second storage unit and the cooling units for cooling down heat produced from the storage units.

7. A power controlling method for use in a storage device having a first storage unit for storing data transmitted from an upper device over a long time and a second storage unit for temporarily storing data including part of the data stored in the first storage unit when the upper device accesses the first storage unit, comprising:
    causing the storage device to perform a storage capacity monitoring process for monitoring a storage amount of data stored in a plurality of storage units, configuring the second storage unit, and for detecting a storage unit the storage amount of which is a predetermined ratio or higher;
    causing the storage device to perform a power-on process to determine a storage unit to be used next to the storage unit detected by the storage capacity monitoring process, using priorities of the storage units, the priorities of which are determined to increase the cooling efficiency to the highest in accordance with the hardware configuration of the storage unit, and to power on a storage unit by issuing a power-on instruction to the determined storage unit;
    causing the storage device to perform an access state monitoring process to monitor a state of accesses from the upper device to the plurality of storage units, to configure the second storage unit, and to detect a storage unit to which no access is made over a time period; and
    causing the storage device to perform a power-off process to power off storage units by issuing a power-off instruction to the storage unit which stores no data, and the storage unit which stores data up to its maximum storage capacity among storage units detected by the access state monitoring process.

8. The power controlling method according to claim 7, wherein
    the power-on process powers on a storage unit by issuing the power-on instruction to the storage unit a priority of which is second to the storage unit detected by the storage capacity monitoring process.

9. The power controlling method according to claim 8, wherein
    the priority is an order determined so that a cooling effect produced by cooling units is increased to the highest in a positional relationship between the storage units configuring the second storage unit and the cooling units for cooling down heat produced from the storage units.

10. The power controlling method according to claim 7, further comprising
    causing the storage device to perform a data collecting process to identify one storage unit by extracting a storage unit a data storage amount of which is within a range from among the storage units detected by the access state monitoring process, and for moving data stored in the extracted storage unit to the one storage unit.

11. The power controlling method according to claim 10, wherein
the data collecting process extracts third storage units a data storage amount of which is within a range from among the storage units detected by the access state monitoring process, and defines a fourth storage unit, a priority of which is the highest among the third storage units, to be the one storage unit.

12. The power controlling method according to claim 11, wherein
the priority is determined so that a cooling effect produced by cooling units is increased to the highest in a positional relationship between the storage units configuring the second storage unit and the cooling units for cooling down heat produced from the storage units.

13. A storage medium on which is coded a power controlling program executed by an electronic processing system for causing a storage device, which has a first storage unit for storing data transmitted from an upper device over a long time and a second storage unit for temporarily storing data including part of the data stored in the first storage unit when the upper device access the first storage, to execute:
a storage capacity monitoring process to monitor a storage amount of data stored in a plurality of storage units, to configure the second storage unit, and to detect a storage unit the storage amount of which is a predetermined ratio or higher;
a power-on process to determine the storage unit to be used next to the storage unit detected by the storage capacity monitoring process, using priorities of the storage units, the priorities of which are determined to increase the cooling efficiency to the highest in accordance with the hardware configuration of the storage unit, and power on a storage unit by issuing a power-on instruction to the determined storage unit;
an access state monitoring process to monitor a state of accesses from the upper device to the plurality of storage units, to configure the second storage unit, and to detect a storage unit to which no access is made over a time period; and
a power-off process to power off storage units by issuing a power-off instruction to the storage unit which stores no data, and the storage unit which stores data up to its maximum storage capacity among storage units detected by the access state monitoring process.

14. The storage medium on which is coded the power controlling program according to claim 13, wherein
the power-on process powers on a storage unit by issuing the power-on instruction to the storage unit a priority of which is second to the storage unit detected by the storage capacity monitoring process.

15. The storage medium on which is coded the power controlling program according to claim 14, wherein
the priority is an order determined so that a cooling effect produced by cooling units is increased to the highest in a positional relationship between the storage units configuring the second storage unit and the cooling units for cooling down heat produced from the storage units.

16. The storage medium on which is coded the power controlling program according to claim 13, causing the storage device to further execute
a data collecting process to identify one storage unit by extracting a storage unit a data storage amount of which is within a range from among the storage units detected by the access state monitoring process, and for moving data stored in the extracted storage unit to the one storage unit.

17. The storage medium on which is coded the power controlling program according to claim 16, wherein
the data collecting process extracts third storages unit a data storage amount of which is within a range from among the storage units detected by the access state monitoring process, and defines a fourth storage unit, a priority of which is the highest among the third storage units, to be the one storage unit.

18. The storage medium on which is coded the power controlling program according to claim 17, wherein
the priority is determined so that a cooling effect produced by cooling units is increased to the highest in a positional relationship between the storage units configuring the second storage unit and the cooling units for cooling down heat produced from the storage units.

19. A storage device, which has a first storage unit for storing data transmitted from an upper device over a long time and a second storage unit for temporarily storing data including part of the data stored in the first storage unit, comprising:
a storage capacity monitoring unit to monitor a storage amount of data stored in a plurality of storage units, to configure the second storage unit, and to detect a storage unit the storage amount of which is a predetermined ratio or higher;
a power-on unit to determine a storage unit to be used next to the storage unit detected by the storage capacity monitoring unit, using priorities of the storage units optimized for an arrangement of the storage units to be efficiently cooled down, and to power on a storage unit by issuing a power-on instruction to the determined storage unit;
an access state monitoring unit to monitor a state of accesses from the upper device to the plurality of storage units, to configure the second storage unit, and to detect a storage unit to which no access is made over a time period;
a power-off unit to power off storage units by issuing a power-off instruction to the storage unit which stores no data, and the storage unit which stores data up to its maximum storage capacity among storage units detected by the access state monitoring unit; and
a data moving unit to move data stored on a storage unit having lower priority to a storage unit which is determined to increase the cooling efficiency to the highest in accordance with the hardware configuration of the second storage unit.

* * * * *